United States Patent [19]

Sugiyama et al.

[11] Patent Number: 5,237,230
[45] Date of Patent: Aug. 17, 1993

[54] DEVICE FOR STARTING AN ENGINE AND GENERATING POWER

[75] Inventors: Takeshi Sugiyama; Kazuhiro Odahara, both of Himeji, Japan

[73] Assignee: Mitsubishi Denki K.K., Tokyo, Japan

[21] Appl. No.: 956,276

[22] Filed: Oct. 5, 1992

[30] Foreign Application Priority Data

Nov. 26, 1991 [JP] Japan ................... 3-337779

[51] Int. Cl.⁵ .................... H02K 47/04; F02N 11/04
[52] U.S. Cl. ...................... 310/113; 290/46
[58] Field of Search ............. 310/113, 52, 58, 64, 310/89, 102 R; 290/22, 46, 49

[56] References Cited

U.S. PATENT DOCUMENTS

| | | | |
|---|---|---|---|
| 4,162,419 | 7/1979 | DeAngelis | 310/266 |
| 4,562,367 | 12/1985 | Kumatani | 310/62 |
| 4,839,547 | 6/1989 | Lordo et al. | 310/52 |
| 4,862,009 | 3/1989 | King | 290/22 |
| 4,948,997 | 8/1990 | Ohmitsu et al. | 310/113 |
| 5,028,826 | 7/1991 | Kitamura | 310/51 |
| 5,095,235 | 3/1992 | Kitamura | 310/68 D |
| 5,126,582 | 6/1992 | Sugiyama | 290/46 |
| 5,132,604 | 7/1992 | Shimane et al. | 290/46 |

FOREIGN PATENT DOCUMENTS

| | | | |
|---|---|---|---|
| 0048213 | 9/1981 | European Pat. Off. | 310/113 |
| 198556 | 8/1988 | Japan | 310/113 |

Primary Examiner—Steven L. Stephan
Assistant Examiner—Matthew Nguyen
Attorney, Agent, or Firm—Sughrue, Mion, Zinn, Macpeak & Seas

[57] ABSTRACT

A device for starting an engine and generating power comprising a frame attached to a main body of an engine, a stator core fixed in the frame and attached with a stator coil, a field core attached to an inner end face of the frame, having a clearance in the radial direction between the field core and an inner peripheral portion of the stator core and accommodating a field coil, a claw-pole type rotating field electrodes disposed between the stator core and the field core interposing air-gaps respectively among the field electrodes, the stator core and the field core, a driving shaft passing through an inner diameter portion of the field core and supported thereby through bearings, a planetary gear device interposed between a crankshaft and the driving shaft an end portion of which is fixed with a sun gear which decelerates and transmits first rotation of the driving shaft to the crankshaft in starting an engine and accelerates and transmits second rotation of the crankshaft to the driving shaft in generating power, a transmission supporting body attached to an end portion of the driving shaft, provided with a plurality of blades for serving as a fan on an outer end face thereof and attached with and supporting the rotating field electrodes, and a front cover attached to a front portion of the frame, surrounding the transmission supporting body and provided with intake openings for a cooling wind at an outer end portion thereof.

3 Claims, 3 Drawing Sheets

DEVICE FOR STARTING AN ENGINE AND GENERATING POWER

BACKGROUND OF THE INVENTION

This invention relates to a device for starting an engine and generating power which is connected to an internal combustion engine, for starting the engine as a starting motor and serving as a generator after the starting.

In a general conventional device for starting an engine and generating power attached with a planetary gear, as shown for instance, in Japanese Unexamined Patent Publication No. 81563/1991, no special cooling device is provided for an armature coil and a field coil. FIG. 4 is a sectional diagram showing a conventional device for starting engine and generating power. As shown in FIG. 4, the device is constructed by a rotating body 103 integrated with a first rotor 101a and a second rotor 101b by a ring 102, a field coil 105 wound with a field core 104, and an armature coil 106 as major components. This device is not provided with an equipment for cooling the armature coil and the field coil.

There are devices of this kind each of which cools an armature coil and a field coil, disclosed for instance, in Japanese Patent Publication No. 198556/1988 and Japanese Unexamined Patent Publication No. 202257/1988. In both devices for starting up an engine and charging electricity, rotating field poles are attached to a crankshaft of an engine and the field poles are excited by excitation coils. Stator cores provided with stator coils are attached to main bodies of the engines.

In starting, power is supplied to the excitation coil and an AC voltage having a low frequency is supplied to the stator coil thereby synchronizingly rotating the rotating field poles and the device transmits the rotation to the engine as a starting motor. By increasing the frequency of the supplied AC voltage, the rotation of the rotating field poles is increased thereby starting the engine. When the engine is started, the supply of the AC voltage to the stator coil is stopped. Since the rotating field poles are rotated by a crankshaft, an AC voltage is generated in the stator coil, and the device charges electricity through a rectifier as a generator.

In the former device for starting an engine and charging electricity, a cooling solution of the engine per se flows in a cooling water passage surroundingly provided at a back portion of an assembly of the stator core and the stator coil thereby cooling the device.

Furthermore, in the latter device for starting an engine and charging electricity, a thermally conductive ring is provided between a cylinder block or a bracket and a transmission case through a thermally conductive seal cover. A thermally conductive gel is sealed among the cylinder block or the bracket, an inter peripheral portion of the ring and an outer peripheral portion of the stator coil. The heat of the stator coil is transferred to the cylinder block or the bracket and the ring through the thermally conductive gel thereby cooling the device.

In such a conventional device for starting an engine and charging electricity, the rotating field poles are directly connected to the crankshaft. In starting, a large torque output is required at a low speed rotation. Therefore, the device is magnified. Since the revolution speed is below a pertinent value in power generating, the output can not be enhanced. Furthermore, a sealing means is required for the passage of the cooling solution or the thermally conductive gel. Therefore, the structure thereof is complicated, the fabrication thereof is difficult, the price thereof is elevated, and a large amount of time is required for check and maintenance thereof.

SUMMARY OF THE INVENTION

It is an object of the present invention to solve the above problems and to provide a device for starting an engine and generating power wherein the device is operated at a reduced rotation speed in starting an engine thereby starting the engine and in power generating, the engine is driven by a increased rotation speed, the structure of a ventilating cooling is simple, the fabrication thereof is easy, the cooling is effectively performed and time and labor for the check and maintenance is saved.

According to a first aspect of the present invention, there is provided a device for starting an engine and generating power comprising:

a frame attached to a main body of an engine;

a stator core fixed in the frame and attached with a stator coil;

a field core attached to an inner end face of the frame, having a clearance in the radial direction between the field core and an inner peripheral portion of the stator core and accommodating a field coil;

a claw-pole type rotating field electrodes disposed between the stator core and the field core interposing air-gaps respectively among the field electrodes, the stator core and the field core;

a driving shaft passing through an inner diameter portion of the field core and supported thereby through bearings;

a planetary gear device interposed between a crankshaft and the driving shaft an end portion of which is fixed with a sun gear which decelerates and transmits first rotation of the driving shaft to the crankshaft in starting an engine and accelerates and transmits second rotation of the crankshaft to the driving shaft in generating power;

a transmission supporting body attached to an end portion of the driving shaft, provided with a plurality of blades for serving as a fan on an outer end face thereof and attached with and supporting the rotating field electrodes; and a front cover attached to a front portion of the frame, surrounding the transmission supporting body and provided with intake openings for a cooling wind at an outer end portion thereof.

According to a second aspect of the present invention, there is provided a device for starting an engine and generating power according to the first aspect, further comprising:

a plurality of ventilation passages provided at a back face of the stator core in an inner portion of the frame.

According to a second aspect of the present invention, there is provided a device for starting an engine and generating power according to the second aspect, further comprising:

a plurality of cooling fins at an outer peripheral portion of the frame.

In this invention, in starting power is supplied to the excitation coil and power is also supplied to the stator coil thereby rotating the rotating field poles. The rotation transmits through the transmission body and the driving shaft, and is decelerated by the planetary gear device and rotates the crankshaft thereby starting the engine. When the engine is started, the current flowing to the stator coil is stopped. The rotation of the crankshaft is accelerated by the planetary gear device and rotates the rotating feed poles, thereby generating an AC voltage in the stator coil which becomes a power source for a driving motor of a vehicle and also a power source for electricity charging. On the other hand, by the rotation of this fan, a cooling wind from outside flows in the ventilation passage in the frame thereby cooling the stator coil and the stator core.

EXAMPLE 1

Figure 1:
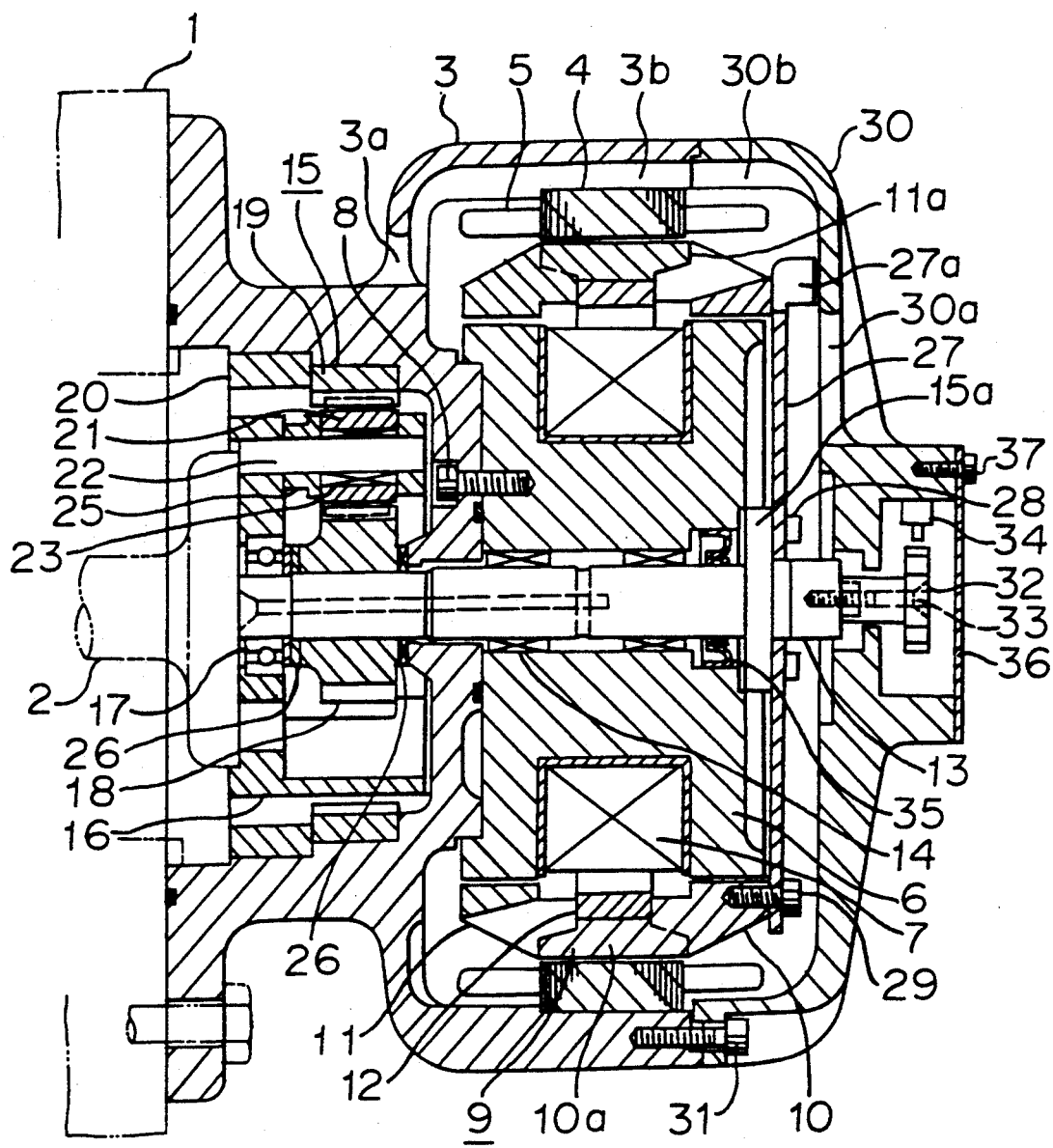
FIG. 1 is a longitudinal sectional diagram of an embodiment of a device for starting an engine and generating power according to the present invention.

FIG. 1 is a longitudinal sectional diagram of a device for starting an engine and generating power according to the present invention. Reference numeral 1 designates an engine main body wherein a flange of a crankshaft 2 is provided. Numeral 3 designates a frame fixed to a front end of the engine main body 1, composed, for instance, of an aluminum material and provided with a great number of axial ventilation passages 3b at the inner peripheral portion thereof and a great number of exhaust openings 3a at a rear end portion thereof. Numeral 4 designates a stator core fixed to the inner peripheral portion of the frame 3 which is provided with a stator coil 5 of a three-phase winding. Numeral 6 designates a field core fixed to an end face of the engine main body by a bolt 8, which is wound with a field coil 7. Numeral 9 designates rotating field poles disposed between the stator core 4 and the field core 6 having respectively air-gaps among them, which are consisted of field poles 10 and 11 connected to a nonmagnetic connecting ring 12 by welding or the like and arranged at both sides of the connecting ring. Claw poles 10a and 11a are protruded from the field poles 10 and 11 alternately with respect to the circumferential direction.

Numeral 13 designates a driving shaft which passes through an inner diameter portion of the field core 6 and is supported thereby through bearings 14, and numeral 15, a planetary gear device constructed as follows. A transmission body 16 is supported by the driving shaft 13 through a bearing 17, which is fixed and connected to a flange of the crankshaft 2. A sun gear 18 is fixed to the driving shaft 13 and an inner gear 19 is fixed to the inside of the frame 3 which is secured by a fixed ring 20. A plurality of planetary gears 21 are meshed with the sun gear 18 and the inner gear 19, which spin and orbitally rotate around the sun gear, the planetary gears 21 are supported by supporting pins 22, the end portions of which are fixed to the transmission body 16 through bearings 23. Numeral 25 designates a spacing ring and 26, a pair of thrust bearings which contact the both ends of the sun gear 18.

Next, a transmission supporting body 27 is fixed to a flange 15a at the front portion of the driving shaft 13 by bolts 28 and is attached with field poles 10 by bolts 29 at an outer periphery side of an inner end face thereof for supporting the rotating field poles 9. A plurality of blades 27a are provided at the transmission supporting body 27, which also serves as a fan. A front cover 30 is attached to the front end of the frame 3 by bolts 31, the front end portion of which is provided with a plurality of intake openings 30a, and at an inner periphery on the outer diameter side thereof, ventilation passages 30b communicate with the respective ventilation passages 3b of the frame 3. At the front end portion of the driving shaft 13, a rotating body 32 provided with a plurality of teeth is provided by a fixing screw 33. At the front portion of the front cover 30, a plurality of angle detectors 34 corresponding to the teeth, are attached, which detect the position of the rotating field poles 9. Numeral 35 designates an oil seal attached to the field core 6 and numeral 36 designates an end lid attached to the front portion of the front cover 30 by bolts 37.

Figure 2:
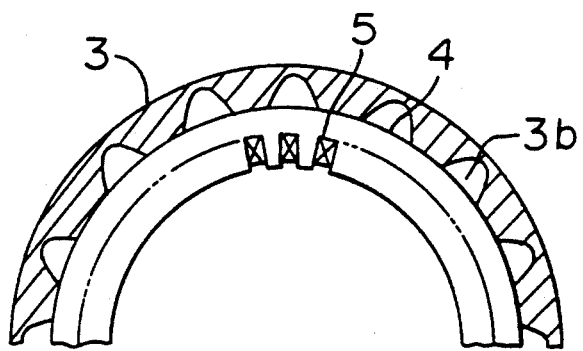
FIG. 2 is a front sectional view showing ventilation passages of a frame in FIG. 1.

FIG. 2 is a front sectional diagram of the stator core of the frame 3 of FIG. 1. A great number of the axial ventilation passages 3b are provided at the inner peripheral portion of the frame 3.

Next, an explanation will be given to the operation. In starting the engine, power is supplied to the excitation coil 7 and a three-phase AC voltage having a low frequency is supplied to the stator coil 5. In this way, the rotating field poles 9 are rotated at a low speed by the device as a starting motor and the rotation is transmitted to the sun gear 18 through the transmission supporting body 27 and the driving shaft 13. The rotation is decelerated through the planetary gear device 15 and rotates the crankshaft 2. The position of the rotating field poles 9 is detected by the angle detectors 34. By a control means (not shown) the frequency of the three-phase AC voltage of the stator coils 5 is gradually increased and the phase thereof is controlled, thereby elevating the revolution number to a value required for the starting. When the engine is started, the application of the voltage to the stator coil 5 is stopped. When the engine has been started, the rotation of the crankshaft 2 is accelerated through the planetary gear device 15 and rotates the rotating field poles 9 through the driving shaft 13 and the transmission supporting body 27. In this way, the device generates the three-phase AC voltage as a three-phase AC generator. This three-phase AC voltage is supplied to a driving motor (not shown) of a vehicle thereby running the vehicle by the rotation. Furthermore, the three-phase AC voltage is converted into a DC voltage through a rectifier (not shown) which is supplied to a storage battery for charging electricity and to DC loads.

On the other hand, the cooling operation of the device for starting an engine and generating power is as follows. By the rotation of the transmission supporting body 27 which also serves as a fan, a cooling air flow is introduced from the intake openings 30a, which flows through the ventilation passages 30b and 3b and is exhausted through the exhaust openings 3a. In this way, the stator coil 5 and the stator core 4 are effectively cooled.

EXAMPLE 2

Figure 3:
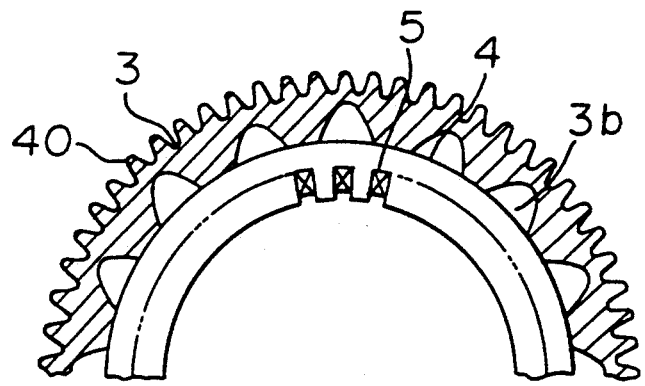
FIG. 3 is a front sectional view showing ventilation passages of a frame in embodiment 2 of this invention.
Figure 4:
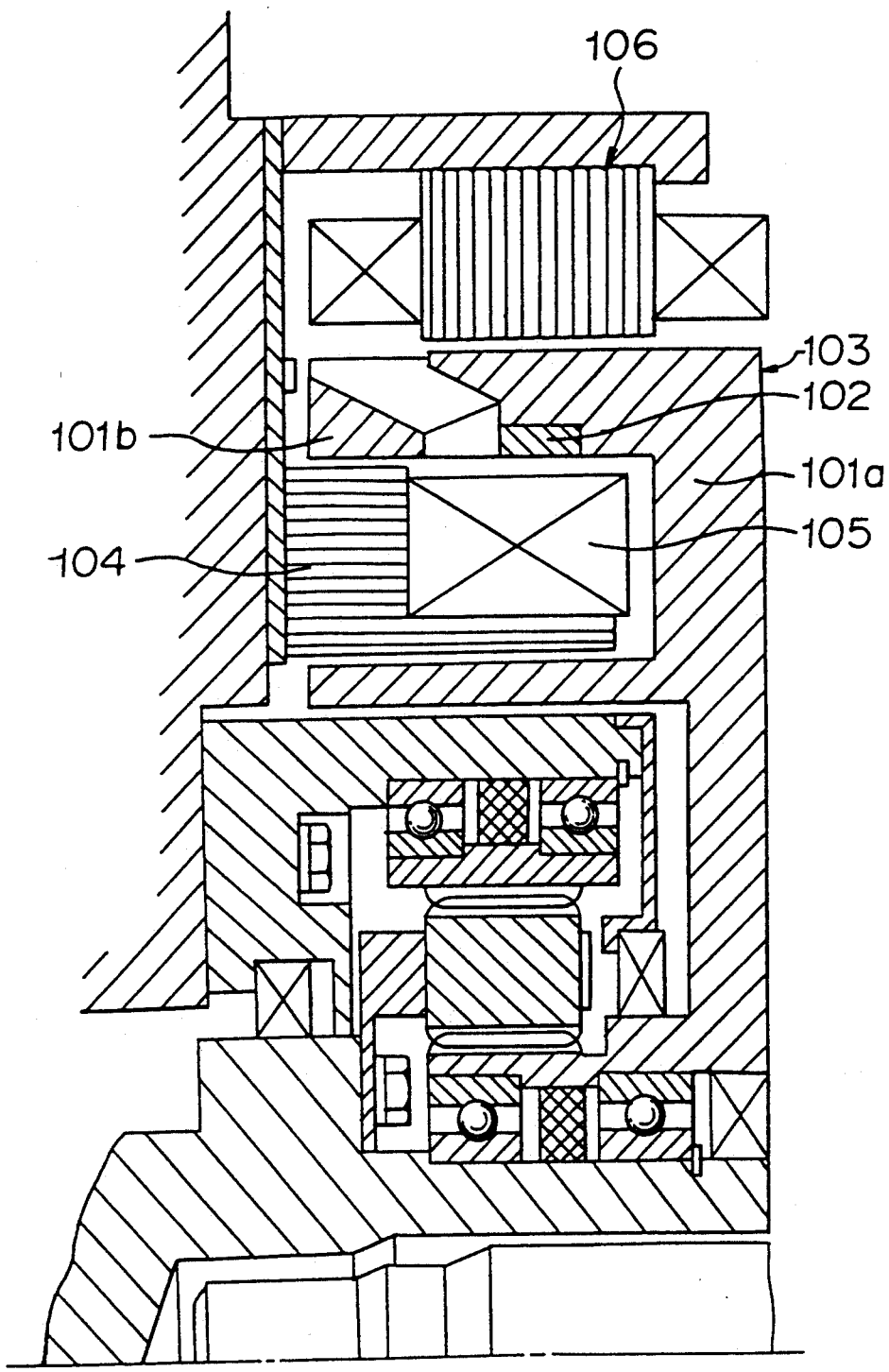
FIG. 4 is a sectional diagram showing a conventional device for starting an engine and generating power.

FIG. 3 is a front sectional diagram showing embodiment 2 of a stator core of the frame according to the present invention. A great number of cooling fins 40 are provided at the outer periphery of the frame 3. By a fanning action due to the rotation of the transmission supporting body 27, the temperature of the cooling air passing through the ventilation passages 3b is gradually elevated which is caused by cooling the stator. However, the heat dissipation from the cooling fins 40 of the frame 3 is promoted thereby enhancing the cooling effect all the more.

EXAMPLE 3

In the above Examples, the field coils 7 are directly wound in the field core 6 through an insulator. However, the field core may be divided in the axial direction and the field cores which are wound in coil bobbins may be accommodated in both directions and integrated.

As stated above, according to the present invention, the armature coil and the field coil are cooled down.

As stated above, according to the present invention, the stator is fixed in the frame which is attached to the engine main body and the field core attached with the field coil is provided therein. The claw-pole type rotating field poles are arranged between the inner peripheral portion of the stator core and the outer peripheral portion of the field core respectively interposing air gaps among them. The driving shaft is connected to the crankshaft through the planetary gear device. The rotating field poles are fixed to and supported by the transmission supporting body which is fixed to the front end side of the driving shaft. Therefore, the functions of starting an engine and generating power are combined by a single body. Moreover, pertinent rotational speeds are provided for the both functions, which downsizes the device.

Furthermore, the outer end phase of the transmission supporting body is provided with the blades which constitute a fan. The ventilation passages are provided between the inner portion of the frame and the back portion of the stator core, thereby flowing the cooling wind by the fan. Accordingly, the device is provided with a simple structure, the fabrication thereof is easy and the cooling of the stator is effectively performed.

We claim:

1. A device for starting an engine and generating power, comprising:
a frame attached to a main body of an engine;
a stator core fixed in the frame and attached with a stator coil;
a field core attached to an inner end face of the frame, having a clearance in a radial direction between the field core and an inner peripheral portion of the stator core and accommodating a field coil;
claw-pole type rotating field electrodes disposed between the stator core and the field core and having interposing air-gaps respectively among the field electrodes, the stator core and the field core;
a driving shaft passing through an axial bore of the field core and supported thereby through bearings such that said drive shaft is rotatable with respect to said field core;
a planetary gear device interposed between a crankshaft and the driving shaft, an end portion of said planetary gear device being fixed with a sun gear which decelerates and transmits first rotation of the driving shaft to the crankshaft in starting an engine and accelerates and transmits second rotation of the crankshaft to the driving shaft in generating power;
a transmission supporting body fixedly attached to an end portion of the driving shaft and including a plurality of blades serving as a fan on an outer end face thereof and attached with and supporting the rotating field electrodes such that said field electrodes rotate relative to said field and stator cores upon rotation of said driving shaft; and
a front cover attached to a front portion of the frame, surrounding the transmission supporting body and having air intake openings for allowing cooling air to flow into said device for cooling at least said stator coil.

2. The device for starting an engine and generating power according to claim 1, further comprising:
a plurality of ventilation passages provided at a back face of the stator core in an inner portion of the frame.

3. The device for starting an engine and generating power according to claim 2 further comprising:
a plurality of cooling fins at an outer peripheral portion of the frame.

* * * * *